(12) United States Patent
Matos

(10) Patent No.: US 12,199,975 B2
(45) Date of Patent: Jan. 14, 2025

(54) APPARATUS AND METHODS FOR AUTOMATING PASSWORD GENERATORS

(71) Applicant: Bank of America Corporation, Charlotte, NC (US)

(72) Inventor: Marcus R. Matos, Richardson, TX (US)

(73) Assignee: Bank of America Corporation, Charlotte, NC (US)

( * ) Notice: Subject to any disclaimer, the term of this patent is extended or adjusted under 35 U.S.C. 154(b) by 428 days.

(21) Appl. No.: 17/453,014

(22) Filed: Nov. 1, 2021

(65) Prior Publication Data

US 2023/0134511 A1    May 4, 2023

(51) Int. Cl.
*H04L 29/06*    (2006.01)
*H04L 9/40*    (2022.01)

(52) U.S. Cl.
CPC ...... *H04L 63/0838* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 1,058,761 A | 4/1913 | Klein et al. | |
| 7,502,933 B2 | 3/2009 | Jakobsson et al. | |
| 7,870,153 B2 * | 1/2011 | Croft | G06F 16/748 709/219 |
| 8,184,872 B2 | 5/2012 | Lu et al. | |
| 8,312,519 B1 * | 11/2012 | Bailey | H04L 9/3234 713/168 |
| 8,543,829 B2 | 9/2013 | Von Krogh | |
| 9,413,753 B2 | 8/2016 | Dietrich et al. | |
| 10,025,918 B2 | 7/2018 | Stahl et al. | |
| 10,536,436 B1 * | 1/2020 | Barbour | H04L 63/0838 |
| 10,929,524 B2 | 2/2021 | Taratine et al. | |
| 11,115,213 B1 * | 9/2021 | Marimuthu | G06F 21/42 |

(Continued)

OTHER PUBLICATIONS

Malikvoich, Marimov Madjit et al. A Method of Efficient OTP Generation Using Pseudorandom Number Generators. 2019 International Conference on Information Science and Communications Technologies (ICISCT). https://ieeexplore.ieeeE.org/stamp/stamp.jsp?tp=&arnumber=9011825 (Year: 2019).*

(Continued)

*Primary Examiner* — Jeremiah L Avery
(74) *Attorney, Agent, or Firm* — Weiss & Arons LLP

(57) ABSTRACT

Apparatus and methods for automating replacement and disablement of one-time password ("OTP") generators are provided. The apparatus and methods may include an authentication engine on a server and an OTP generator that may generate a standard OTP or an enhanced OTP that includes additional information beyond the standard OTP. The authentication engine may analyze the additional information when an enhanced OTP is received, and in response to that additional information, execute an operation. The operation may include initiating the sending of a new OTP generator to a user when the OTP generator's battery is failing or the OTP generator has been damaged or disabling an OTP generator when the OTP generator has been tampered with.

16 Claims, 5 Drawing Sheets

(56) References Cited

U.S. PATENT DOCUMENTS

| | | | |
|---|---|---|---|
| 11,140,155 B2* | 10/2021 | Alhawaj | H04L 63/18 |
| 2006/0208066 A1* | 9/2006 | Finn | H04H 60/74 |
| | | | 235/441 |
| 2006/0219776 A1* | 10/2006 | Finn | G06K 7/0043 |
| | | | 235/380 |
| 2007/0250920 A1* | 10/2007 | Lindsay | G06F 21/31 |
| | | | 726/7 |
| 2008/0052524 A1 | 2/2008 | Cedar et al. | |
| 2008/0086641 A1* | 4/2008 | Rodgers | H04L 63/0435 |
| | | | 713/176 |
| 2008/0276098 A1* | 11/2008 | Florencio | H04L 63/0838 |
| | | | 713/183 |
| 2009/0064294 A1* | 3/2009 | Cook | H04L 9/3234 |
| | | | 726/9 |
| 2011/0289576 A1* | 11/2011 | Cheng | G09C 1/00 |
| | | | 726/9 |
| 2015/0199684 A1* | 7/2015 | Maus | H04L 67/12 |
| | | | 705/71 |
| 2016/0253651 A1* | 9/2016 | Park | G06Q 20/34 |
| | | | 705/39 |
| 2016/0323267 A1* | 11/2016 | Sun | H04W 12/086 |
| 2017/0063566 A1* | 3/2017 | Seminario | H04L 67/12 |
| 2017/0279795 A1* | 9/2017 | Redberg | H04L 63/0861 |
| 2018/0308116 A1* | 10/2018 | Maggio | G06Q 30/0245 |
| 2021/0065165 A1* | 3/2021 | Wadhwa | G06Q 20/027 |
| 2022/0295189 A1* | 9/2022 | Sahgal | H04R 25/353 |
| 2023/0134511 A1* | 5/2023 | Matos | H04L 63/1425 |
| | | | 726/6 |
| 2024/0064520 A1* | 2/2024 | Bankston | H04W 12/33 |

OTHER PUBLICATIONS

Park, Beum-Su et al. On a Digital-Right-Management system using One-Time-Password. 5th International Conference on Computer Sciences and Convergence Information Technology. https://ieeexplore.ieee.org/stamp/stamp.jsp?tp=&arnumber=5711214 (Year: 2011).*

AbouSteit, Mohamed H.S. et al. A Novel Approach For Generating One-Time Password With Secure Distribution. 2020 Fourth World Conference on Smart Trends in Systems, Security and Sustainability (WorldS4). https://ieeexplore.ieee.org/stamp/stamp.jsp?tp=&arnumber=9210322 (Year: 2020).*

* cited by examiner

APPARATUS AND METHODS FOR AUTOMATING PASSWORD GENERATORS

FIELD OF TECHNOLOGY

Aspects of the disclosure relate to providing apparatus and methods for automating replacement and disablement of one-time password generators.

BACKGROUND OF THE DISCLOSURE

Hardware based one-time password ("OTP") generators are increasingly used by various institutions to provide an additional layer of authentication and authorization security. OTP generators can take various form factors, for example, such as a keyfob, a credit card form factor, or a USB thumb drive form factor. Many are equipped with non-replaceable parts and batteries. When the battery fails or the OTP generator breaks (or tampering is suspected), it is incumbent upon the user to replace the OTP generator. This may cause delay and stress for the user and institution.

Generally, OTP generators function by generating a passcode based on a unique formula (or key/seed) with one of two inputs: the time or a counter increased by a button press. These values may be run through a cryptographic hash algorithm to produce a readable code or value. Usually, the code is a string of numbers. A user may then input that code into an authentication screen and if it is correct, the user may be authenticated or partially authenticated, or authorized.

The code or value generated is simply a passcode and contains no other information for the user or authentication/authorization service. It would be desirable for apparatus and methods to include additional information in the passcode and for the authentication service to then initiate a specific operation in response to the additional information, such as replacing or disabling the OTP generator.

SUMMARY OF THE DISCLOSURE

It is an object of this disclosure to provide apparatus and methods for automating replacement and disablement of one-time password ("OTP") generators.

An apparatus for automating a one-time password ("OTP") generator is provided. The apparatus may include an OTP generator which may be assigned to a user. The OTP generator may include a battery, a display, a form factor, a processor, and a non-transitory memory, one or more sensors, as well as other components such as a power button.

In various embodiments, the form factor may be a keyfob, credit card, USB thumb drive, or other form factors.

The non-transitory memory may be configured to store executable instructions that run on the processor. The instructions may include software that receives and analyzes a sensor reading from the one or more sensors, generates an OTP for the user, and displays the OTP or otherwise presents the OTP for the user to use to authenticate/authorize herself.

Authentication may include an initial authentication, or authentication for continued authorization. For example, a user may login initially and may have to re-authenticate at certain intervals (every hour, every fifteen minutes, etc.) to maintain authorization to use the service, website, etc. In another example, authentication, or additional authorization, may be required to perform certain sensitive functions, after a user has already logged into the service or website.

The apparatus may include an authentication/authorization server. The authentication server may include a communication link that is configured to receive the OTP from the user, a server processor, and a server non-transitory memory configured to store at least an operating system and an authentication engine. The authentication engine may run on the server processor. The authentication engine may receive the OTP, analyze the OTP in order to authenticate the user (or deny authentication not the user), and analyze the OTP to determine if it includes any additional information.

When the sensor input requires, according to the executable instructions, a datum of information to be transmitted to the authentication server, the OTP generator may modify the OTP to include a representation of the datum of information that may be received by the authentication engine. When the authentication engine receives the OTP, analyzes it, and determines that the OTP includes additional information beyond a standard OTP, the engine may analyze the additional information and execute an operation in response to the additional information.

In various embodiments, the one or more sensors may include one or more of a physical state sensor, a battery power level sensor, a light sensor, a GPS/location sensor, as well as other sensors.

In an embodiment, the instructions may require additional information to be transmitted by the OTP to the authentication server if the sensors (i.e., the sensor readings) indicate one or more of the following conditions: 1) the battery needs to be replaced or the charge level is low; 2) the OTP generator has been tampered with; 3) the OTP generator has been opened; 4) the OTP generator has been subject to malicious activity; 5) the OTP generator is located outside an acceptable radius from an expected location; and/or 6) the user is under duress. In an embodiment, the additional information may include the one or more conditions above.

In an embodiment, the operation in response to the additional information may be the server ordering and initiating the sending of a new OTP generator to the user, without any user input.

In various embodiments, additional operations executed in response to receiving additional information with an OTP code may include disabling the OTP generator, alerting an administrator, flagging the user, flagging the OTP generator, alerting security, contacting the user, or other operations.

In an embodiment, the OTP generator may include an encryption controller.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
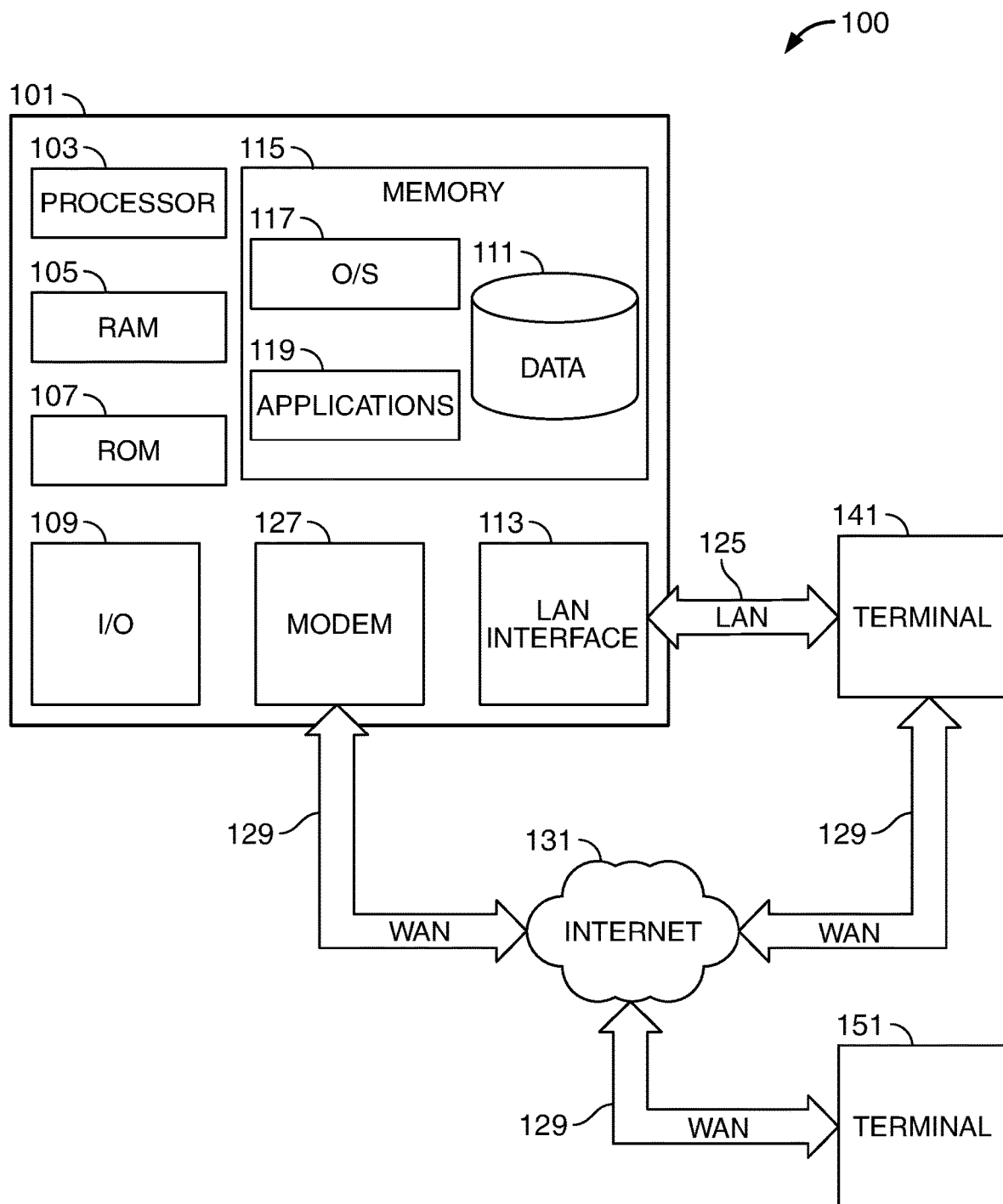
FIG. 1 shows an illustrative apparatus in accordance with principles of the disclosure.

It is an object of this disclosure to provide apparatus and methods for automating replacement and disablement of one-time password ("OTP") generators.

An apparatus for automating certain aspects of a one-time password ("OTP") generator is provided. The apparatus may include an OTP generator which may be assigned to a user. The OTP generator may include a battery, a display, a form factor, a processor, and a non-transitory memory, one or more sensors, as well as other components such as a communication link and a power button.

Standard OTP generators may display a series of digits as the OTP. The more digits, the more secure the OTP may be. In other embodiments, OTP generators may generate codes other than digits, for example, a QR code, a drawing/figure, a series of lights, or a sound. A user may hold the OTP generator up to a camera, QR code reader, or a microphone to authenticate. Additional information may be added to these types of OTP generators by modifying the QR code, the figure, or the sound, to include additional information beyond the standard authentication code. In these various embodiments, an OTP may not be limited to numerical digits.

In an embodiment, the OTP generator may include a biometric scanner, a microphone, or a speaker. In an embodiment, the display may be an LCD screen, an LED screen, and/or an OLED screen. The display may be capable of displaying various colors.

In various embodiments, the form factor may be any suitable form factor, such as a keyfob, credit card, USB thumb drive, or other form factors. Different form factors may have various benefits and drawbacks. For example, a larger form factor may be able to include a larger battery, a larger screen, a more powerful processor, more sensors, or more memory. However, a larger form factor may be more expensive, and more capabilities may reduce battery power faster.

The non-transitory memory may be configured to store executable instructions that run on the processor. The instructions may include software or firmware that receives and analyzes a sensor reading from the one or more sensors, generates an OTP for the user, and displays the OTP or otherwise presents the OTP for the user to use to authenticate herself. The OTP may be generated based on a seed value, a timer, a counter, and/or a formula. The more complex the formula, the more secure the OTP may be.

In an embodiment, the executable instructions may include firmware embedded in the hardware, as opposed to software. Hardwired instructions may be more secure, as long as the physical OTP generator is not tampered with and opened. In an embodiment, the OTP generator may include an encryption controller.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The processor(s) may control the operation of the apparatus and its components, which may include RAM, ROM, an input/output module, and other memory. The microprocessor may also execute all software running on the apparatus. Other components commonly used for computers, such as EEPROM or Flash memory or any other suitable components, may also be part of the apparatus.

The apparatus may include an authentication server. The authentication server may include a communication link that is configured to receive the OTP from the user, a server processor, and a server non-transitory memory configured to store at least an operating system and an authentication engine.

In an embodiment, the server may be centralized. In an embodiment, the server may be distributed, to utilize a larger pool of computing resources and provide redundancy. Centralized servers may be easier to secure but also provide a single failure point. Distributed servers may be more robust but may provide multiple avenues for malicious actors to target.

The communication link may enable communication with any device where the user may input the OTP as well as with the OTP generator. The communication link may include any necessary hardware (e.g., antennae) and software to control the link. The server may utilize the communication link to communicate, over a network, with any device the user is inputting the OTP into or with the OTP generator itself. Any appropriate communication link may be used. In an embodiment, the network may be the Internet. In another embodiment, the network may be an internal intranet.

The authentication engine may run on the server processor. The authentication engine may receive the OTP, analyze the OTP in order to authenticate the user (or deny authentication to the user), and analyze the OTP to determine if it includes any additional information. Authentication may be denied if the OTP does not match an expected OTP and if it does not contain any additional information. Authentication may be granted if the OTP matches an expected OTP and/or contains additional information. The server may generate an expected OTP using the same formula and methods as the OTP generator.

In an embodiment, every OTP generator may be unique and have a unique seed value or formulae/formula values. A unique value may be used to identify a particular user from a group of users.

In various embodiments, the executable instructions (i.e., software or firmware) may include instructions for analyzing sensor inputs and determining if the sensor readings require additional information to be communicated to the user or the authentication server. For example, if the sensor reading indicates a failing battery, the instructions may conclude that the fact of a failing battery may need to be communicated to the authentication server so that the server may automatically order a new OTP generator for the user.

When the sensor input requires, according to the executable instructions, a datum of information (i.e., additional information) to be transmitted to the authentication server, the OTP generator may modify the OTP to include a representation of the datum of information that may be received by the authentication engine.

Table 1 includes exemplary conditions and formula that may be included in the executable instructions to generate a OTP with or without additional information.

| Condition | Formula | Result |
| --- | --- | --- |
| Standard | f(OTP) = (seed)(counter and/or timer) | Standard OTP |
| Battery is failing | f(OTP + battery) = (seed)(counter and/or timer)(battery) | Enhanced OTP1 |
| Device has been tampered with | f(OTP + tampered) = (seed)(counter and/or timer)(tampered) | Enhanced OTP2 |
| Device has been attacked | f(OTP + attack) = (seed)(counter and/or timer)(attack) | Enhanced OTP3 |
| User is under duress | f(OTP + duress) = (seed)(counter and/or timer)(duress) | Enhanced OTP4 |
| Multiple conditions | f(OTP + condition1 + condition2) = (seed)(counter and/or timer)(condition1)(condition2) | Enhanced OTP5 |

In general, the more complex the algorithm to generate an OTP, the more secure the OTP generator may be. A simplistic formula may be to generate a standard OTP and replace one digit (or one part if it is a non-numerical OTP) with a different digit/part for each condition.

When the authentication engine receives the OTP, analyzes it, and determines that the OTP includes additional information beyond a standard OTP, the engine may analyze the additional information and execute an operation in response to the additional information.

In an embodiment, the authentication engine may generate an expected OTP, which may be the standard OTP. The engine may do so by having identical algorithms and values as the OTP generator. If the received OTP matches the expected OTP, the authentication engine may authenticate the user. If the received OTP does not match the expected OTP, the authentication engine may run the expected OTP through every formula for every condition until it finds a match (in essence, working backwards from the received OTP to determine if it is a possible OTP and what additional information it may include). If it finds a match, the engine will then be aware of the additional information and may be able to execute further operations based on that information. If there is no match, it may indicate to the engine that the received OTP is incorrect and was not generated by the OTP generator, and the engine may deny authentication.

In various embodiments, the one or more sensors may include one or more of a physical state sensor, a battery power level sensor, a light sensor, a GPS/location sensor, as well as other sensors. The physical state sensor may determine if the OTP generator has been tampered with, opened, and/or hacked. The battery power level sensor may determine the remaining charge in the OTP generator's battery. The light sensor may determine environmental conditions.

In an embodiment, the user may indicate duress by modifying a sensor input. For example, the user may cover the light sensor, or cover it in a particular pattern (e.g., cover for two seconds, remove the cover, then cover again for three seconds).

The GPS/location sensor may determine the location of the OTP generator. In an embodiment, if the OTP generator is outside of an expected location (e.g., outside a company's campus), that information may be included as additional information in the enhanced OTP.

In an embodiment, the instructions may require additional information to be transmitted by the OTP to the authentication server if the sensors (i.e., the sensor readings) indicate one or more of the following conditions: 1) the battery needs to be replaced or the charge level is low; 2) the OTP generator has been tampered with; 3) the OTP generator has been opened; 4) the OTP generator has been subject to malicious activity; 5) the OTP generator is located outside an acceptable radius from an expected location; and/or 6) the user is under duress. In an embodiment, the additional information may include the one or more conditions above. Multiple conditions may be included as additional information depending on the algorithm(s) used to generate the enhanced OTPs.

In an embodiment, the operation in response to the additional information may be the server ordering and initiating the sending of a new OTP generator to the user, without any user input. For example, if the additional information indicates that the OTP generator has been damaged or the battery is low, the engine may determine that the user requires a new OTP generator. The engine may autonomously and proactively initiate the process of sending a new OTP generator to the user. The user may be informed that a new OTP generator is being sent.

In various embodiments, additional operations executed by the authentication engine in response to receiving additional information with an OTP code may include disabling the OTP generator, alerting an administrator, flagging the user, flagging the OTP generator, alerting security, contacting the user, or other operations.

In an embodiment, the enhanced OTP may be hidden from a malicious actor, so that the malicious actor may not be aware that it has been caught in the malicious activity. A covert enhanced OTP may be accomplished when the standard OTP is random and unknowable, therefore any change in the standard OTP may be undetectable.

In an embodiment, the enhanced OTP may be a second OTP, and the standard OTP may be a first OTP. In this embodiment, the enhanced OTP may be hidden in that it may not appear on a display until the user activates the OTP generator a second time. For example, if the OTP generator is activated by a user pressing a power button, the first button press may generate a standard OTP and the second button press may generate the enhanced OTP. In this embodiment, the OTP generator may store any additional information gathered at the first button press until the second button press. Performing this action twice may confuse a malicious actor, or it may be useful when the additional information is not urgent. For example, if the additional information is that the battery is failing, but the OTP generator still has the capability to produce a significant number of OTPs before the battery fails, the OTP generator may determine that the additional information can wait for a future generator activation.

A method for increasing information communicated by a one-time password ("OTP") generator is provided. The method may include receiving, at a processor in the OTP generator, a sensor reading from one or more sensors included with the OTP generator. The sensors may include one or more of a physical state sensor, a battery power level sensor, a light sensor, a GPS/location sensor, as well as other sensors. The method may include analyzing the sensor reading and determining whether the sensor reading requires (additional) information to be transmitted to an authentication engine at a server. For example, if a battery sensor reads that the battery charge is low, that low battery information may need to be sent to the authentication engine.

In an embodiment, the OTP generator (or its components, such as a processor) may make the determination through a machine learning algorithm. For example, a machine learning algorithm may learn the expected location(s) of the OTP generator over a pre-determined amount of time, and if the OTP is outside a pre-determined radius from an expected location, the machine learning algorithm may determine that the OTP generator has been lost or stolen. In another example, a machine learning algorithm may analyze data from multiple OTP generators to determine (i.e., learn) when malicious activity has occurred or is occurring.

In an embodiment, the OTP generator may make the determination through a standard algorithm, such as by comparing the sensor readings to stored and expected values, and if the sensor readings are outside the expected values, determining that additional information may need to be transmitted to the authentication engine.

When the OTP generator determines that no additional information is required to be transmitted to the authentication engine, the OTP generator may generate and display to a user a standard OTP. In various embodiments, the standard OTP may be a string of digits, a drawing, a QR code, and/or a sound.

When the OTP generator determines that additional information may be required to be transmitted to the authentication engine, the OTP generator may generate an enhanced OTP that may include a representation of the additional information, and then display that enhanced OTP for the user. The representation may simply be a modified standard OTP, modified through a particular formula that is correlated with the additional information. For example, if the standard OTP is 123456, the additional information is that the battery charge level is low, the formula may state that the fifth digit of the standard OTP is increased by three, generating an enhanced OTP. Any formula may be utilized, and the more complex the formula, the more secure the OTP may be. If multiple sensor readings need to be reported (e.g., a low battery and a suspicion of tampering), any appropriate formula may be utilized. For example, there may be a specific formula for every possible combination of additional information. Or there may be an algorithm that runs the standard OTP through first one formula for one piece of additional information, and then runs that result through a second formula for a second piece of additional information and continuing for further additional information. The order of information may be a distinct algorithm.

The method may include an authentication engine receiving the OTP from the user. This OTP may be referred to as a received OTP. The received OTP may be either the standard OTP or the enhanced OTP. The authentication engine may be located on a server. The server may be centralized or decentralized.

The method may include the authentication engine comparing the received OTP to an expected OTP. The expected OTP may be equivalent to the standard OTP. When the received OTP is equivalent to/favorably compared to the expected OTP, the authentication engine may authenticate the user. When the received OTP is different from the expected OTP, the authentication engine may determine if the received OTP is an enhanced OTP, meaning that it may include additional information. When the authentication engine determines that the received OTP is an enhanced OTP, it may execute an operation in response to the additional information.

In various embodiments, the operation may include one or more of: authenticating the user, ordering and initiating the sending of a new OTP generator to the user, issuing an alert to an administrator, issuing an alert to a security administrator, contacting the user, requiring further authentication, disabling the OTP generator, refusing to authenticate the user, and other operations.

In various embodiments, the additional information may include an indication of one or more of the following conditions: a battery in the OTP generator needs to be replaced, the OTP generator has been tampered with, the OTP generator has been opened, the OTP generator has been subject to malicious activity, the OTP generator is located outside an acceptable radius from an expected location, or the user is under duress. Further conditions may be included.

In an embodiment, the enhanced OTP may be the standard OTP mathematically adjusted according to a distinct formula for each of the conditions.

A method for proactively replacing a one-time password ("OTP") generator is provided. The method may include receiving, at an authentication engine located at a server, an OTP from a user. The server may be centralized or distributed. The method may include the authentication engine decrypting the OTP. When the authentication engine determines that the OTP includes information indicating that the OTP generator needs to be replaced, the authentication engine may initiate the sending of a new OTP generator to the user. In an embodiment, the information indicating that the OTP generator needs to be replaced may include information that a battery powering the OTP generator is failing.

In an embodiment, when the authentication engine determines that the OTP includes data indicating that the user is in duress, the authentication engine may alert an administrator.

In an embodiment, when the authentication engine determines that the OTP includes data indicating that the OTP generator has been tampered with, the authentication engine may alert a security administrator. The method may include the authentication engine sending a signal to the OTP generator to deactivate the OTP generator.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes an OTP generator 101. OTP generator 101 may alternatively be referred to herein as a "computing device." Elements of apparatus 100, including OTP generator 101, may be used to implement various aspects of the apparatus and methods disclosed herein. A "user" of apparatus 100 or OTP generator 101 may include other computer systems or servers or a human.

OTP generator 101 may have one or more processors/microprocessors 103 for controlling the operation of the device and its associated components, and may include RAM 105, ROM 107, input/output module 109, and a memory 115. The microprocessors 103 may also execute all software running on the OTP generator 101—e.g., the operating system 117 and applications 119 such as the OTP generation engine and security protocols. Other components commonly used for computers, such as EEPROM or Flash memory or any other suitable components, may also be part of the OTP generator 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as the OTP generation engine) along with any other data 111 (e.g., seed value(s) and algorithms) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as the authentication engine) along with any data needed for the operation of the apparatus and to allow authentication of a user. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the OTP generator 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple OTP generators 101, along with other devices.

Apparatus 100 may be connected to other systems, computers, servers, OTP generators, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, or servers that include many or all of the elements described above relative to apparatus 100. The network connections depicted in FIG. 1 include a local area network (LAN) 125 and a wide area network (WAN) 129 but may also include other networks. OTP generator 101 may include a network interface controller (not shown), which may include a modem 127 and LAN interface or adapter 113, as well as other components and adapters (not shown). When used in a LAN networking environment, OTP generator 101 is connected to LAN 125 through a LAN interface or adapter 113. When used in a WAN networking environment, OTP generator 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

In an embodiment, the OTP generator 101 may not operate in a networked environment.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The OTP generator may transmit data to any other suitable computer system. The OTP generator may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for generating OTPs. In an embodiment, the authentication engine or OTP generator may use AI/ML algorithm(s). The various tasks may be related to using an OTP generator and a server to proactively and automatically replacing and disabling OTP generators in response to various conditions the OTP generator may be in.

OTP generator 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote OTP generators or authentication servers. The terminals 151 and/or 141 may be computers where the user is interacting with an application that requires a OTP to be input by the user for access.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other OTP generators, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
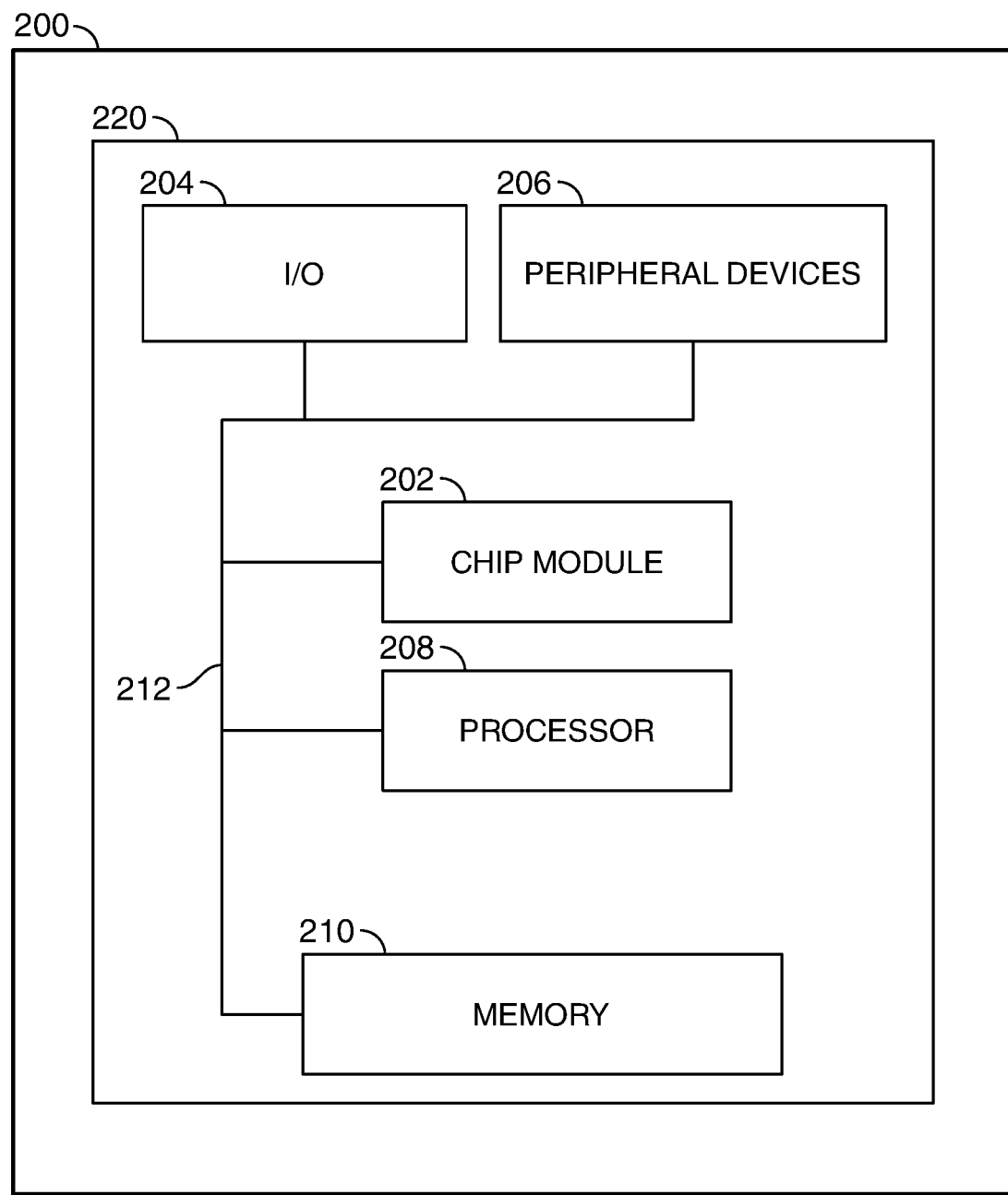
FIG. 2 shows an illustrative apparatus in accordance with principles of the disclosure.

FIG. 2 shows illustrative apparatus 200 that may be configured in accordance with the principles of the disclosure. Apparatus 200 may be a server or OTP generator with various peripheral devices 206. Apparatus 200 may include one or more features of the apparatus shown in FIGS. 1, 3, and 4. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
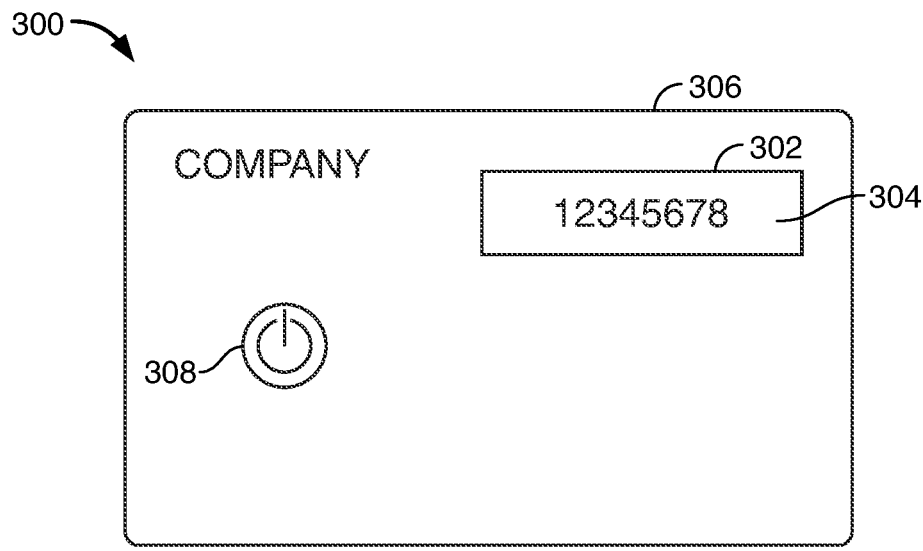
FIG. 3 shows an illustrative apparatus in accordance with principles of the disclosure.

FIG. 3 shows an illustrative apparatus in accordance with principles of the disclosure. An OTP generator 300 may have the form factor of a credit card 306. OTP generator 300 may include a display 302 that may display a digital OTP 304. The OTP generator 300 may include a power or other button 308. The button 308 may act as a counter for an embedded algorithm that may generate an OTP based on a seed value and the number of times the button 308 has been pressed by a user. Button 308 may be a pressure sensitive button. Button 308 may be a touch sensitive button. Actuation of button 308 may provide an electronic signal to the processor or other component of the OTP. A user (not shown) may press button 308 to activate, power on, as a counter, or for another use of the OTP 304. A user (not shown) may read the OTP 304 and input it into an application that is requesting the OTP 304. The application may then send the OTP 304 to an authentication engine to authenticate (or refuse to authenticate) the user. The OTP 304 may include additional information based on various algorithms. Any suitable algorithm may be used.

Figure 4:
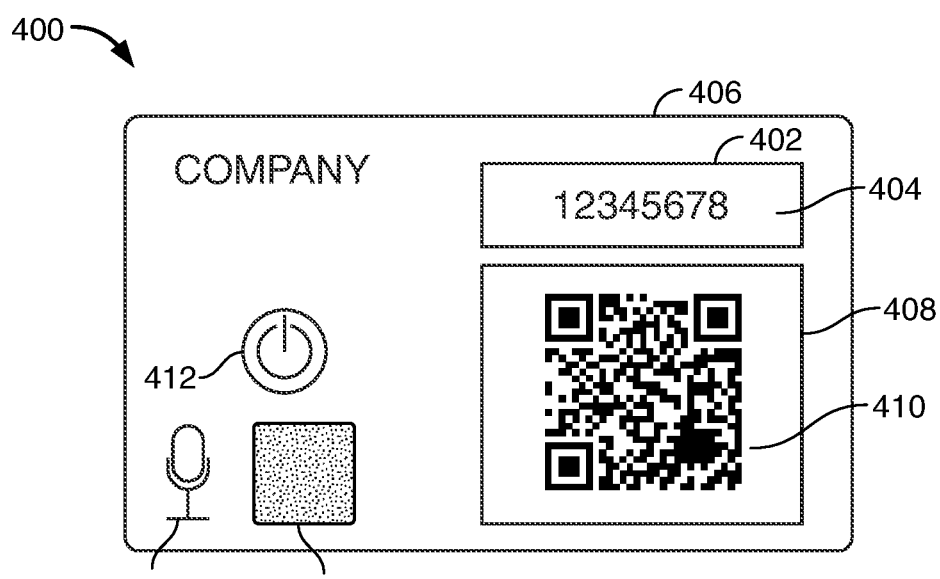
FIG. 4 shows an illustrative apparatus in accordance with principles of the disclosure.

FIG. 4 shows an illustrative apparatus in accordance with principles of the disclosure. OTP generator 400 may have the form factor of a credit card 406. OTP generator 400 may include a numerical display 402 that may display a numerical OTP 404.

OT generator 400 may also include a second display 408 that may display a figure, drawing, or picture or QR code pictorial OTP 410. In an embodiment, one single screen 408 may display both a numerical OTP 404 and a pictorial OTP 410. The displays 402 and 408 may be any suitable display, such as, for example, an LCD, LED, or OLED.

OTP generator 400 may also include a power button 412, a microphone 414, and a speaker 416. OTP generator 400 may also include various sensors (not shown) and a battery (not shown), among other components. A user (not shown) may speak into the microphone 414 to activate the generator 400. The OTP generator 400 may 'display' a code by emitting a sound through speaker 416. The user may place generator 400 near a microphone and use the sound emitted through speaker 416 as the code. Additional information may be embedded within the sound.

Figure 5:
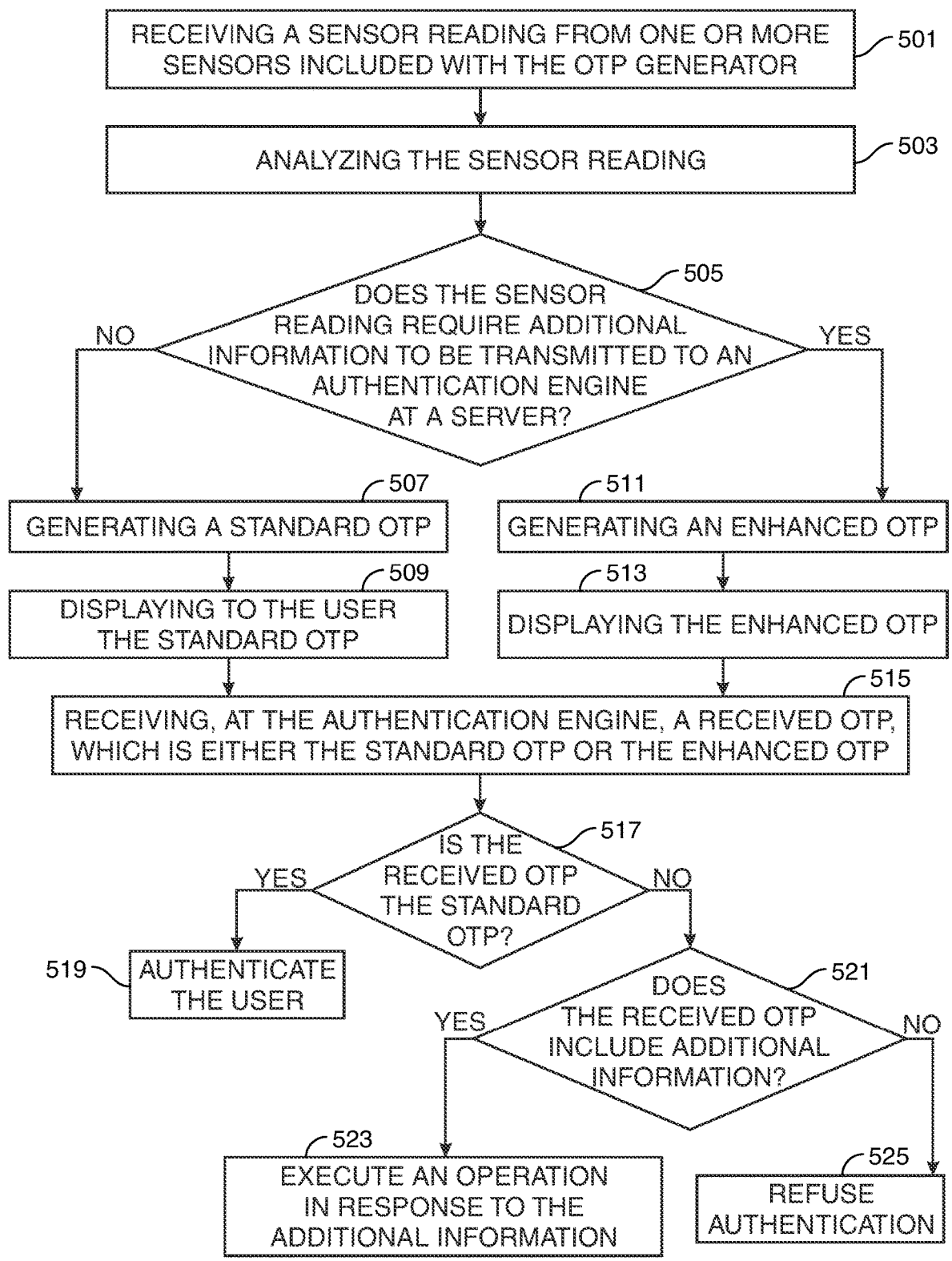
FIG. 5 shows an illustrative flowchart in accordance with principles of the disclosure.

FIG. 5 shows an illustrative flowchart in accordance with principles of the disclosure. Methods may include some or all of the method steps numbered 501 through 525. Methods may include the steps illustrated in FIG. 5 in an order different from the illustrated order. The illustrative method shown in FIG. 5 may include one or more steps performed in other figures or described herein. Steps 501 through 525 may be performed on the apparatus shown in FIGS. 1-4, or other apparatus.

At step 501, an OTP generator may receive a sensor reading from one or more sensors included with the OTP generator. Sensors may include, inter alia, a light sensor, a location sensor, a sound sensor, a radiation sensor, a temperature sensor, a physical state sensor, and/or a battery charge level sensor, among other sensors.

At step 503, the OTP generator may analyze the sensor reading and determine, at step 505, whether the reading requires additional information to be transmitted to an authentication engine at a server. For example, the battery charge level sensor may detect that the battery is failing and the OTP generator may determine that that information should be sent to the authentication engine, in addition to the OTP.

At step 507, if the OTP generator determines that no additional information needs to be sent to the authentication engine, it may generate a standard OTP. At step 509, the generator may display that standard OTP to the user. In a various embodiments, the generator may prompt the user to place the generator before a QR code scanner, a computer camera, a computer microphone, instead of or in addition to displaying the OTP for the user.

At step 511, if the OTP generator determines that additional information does need to be sent to the authentication engine, it may generate an enhanced OTP that includes the additional information. At step 513, the OTP generator may display that enhanced OTP to the user. In a various embodiments, the generator may prompt the user to place the generator before a QR code scanner, a computer camera, a computer microphone, instead of or in addition to displaying the OTP for the user.

The user may then input either the standard OTP or the enhanced OTP in an application requesting an OTP. At step 515, an authentication engine located at a server remote from the user may receive the OTP input by the user as a received OTP. The received OTP should be either the standard OTP or the enhanced OTP.

At step 517, the authentication engine may analyze the received OTP and determine if it is equivalent to the standard OTP. If yes, at step 519 the engine may authenticate the user.

If the received OTP is not the standard OTP, the authentication engine at step 521 may determine if the received OTP is an enhanced OTP that includes additional information. If the received OTP includes additional information, at step 523 the engine may execute an operation in response to the additional information. The operation may be to send a new OTP generator to the user, to authenticate the user, to alert security or an administrator, to deny authentication, to disable the OTP generator, or any other appropriate operation.

If the received OTP is not the standard OTP and does not contain additional information, at step 525, the engine may refuse to authenticate the user.

Figure 6:
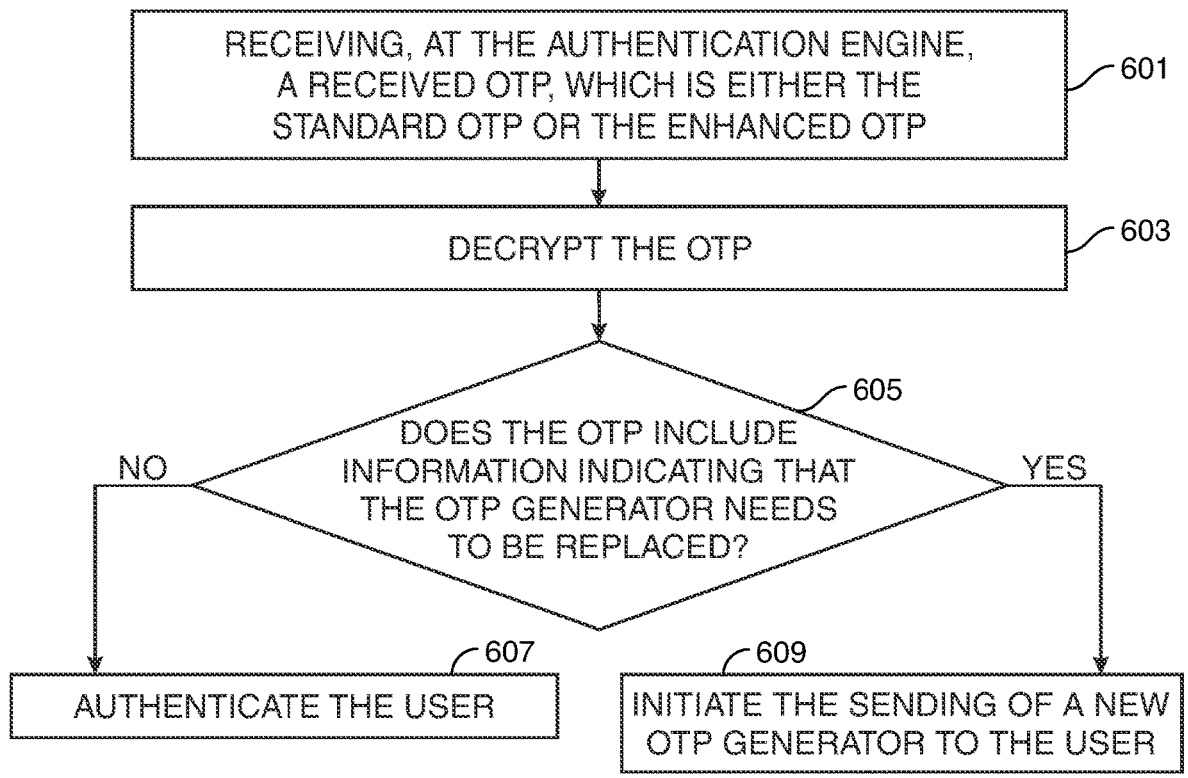
FIG. 6 shows an illustrative flowchart in accordance with principles of the disclosure.

FIG. 6 shows an illustrative flowchart in accordance with principles of the disclosure. Methods may include some or all of the method steps numbered 601 through 609. Methods may include the steps illustrated in FIG. 6 in an order different from the illustrated order. The illustrative method shown in FIG. 6 may include one or more steps performed in other figures or described herein. Steps 601 through 609 may be performed on the apparatus shown in FIGS. 1-4, or other apparatus.

At step 601, an authentication engine at a server may receive an OTP from a user. At step 603, the engine may decrypt the OTP.

At step 605, the engine may determine whether the OTP includes information indicating that the OTP generator needs to be replaced. If not, at step 607, the engine may authenticate the user if the received OTP matches the OTP the engine expected to receive.

At step 609, if the engine determines that the OTP includes information indicating the OTP generator needs to be replaced, the engine may initiate the sending of a new OTP generator to the user. Information indicating the OTP generator needs to be replaced may include that the battery is failing or the OTP generator has been damaged.

Thus, apparatus and methods for automating replacement and disablement of one-time password ("OTP") generators are provided. Persons skilled in the art will appreciate that the present invention can be practiced by other than the described embodiments, which are presented for purposes of illustration rather than of limitation.

What is claimed is:

1. An apparatus for automating replacement of a one-time password ("OTP") generator, the apparatus comprising:
   an OTP generator assigned to a user, the OTP generator comprising:
      a battery;
      a display;
      a form factor;
      a processor; and
      a non-transitory memory configured to store executable instructions that when run on the processor:
         receive and analyze a sensor reading from one or more sensors;
         generate, at the OTP generator, an OTP for the user; and
         display the OTP; and
   an authentication server, the authentication server comprising:
      a communication link configured to receive the OTP from the user;
      a server processor;
      a server non-transitory memory configured to store at least:
         an operating system; and
         an authentication engine that runs on the server processor;
   wherein when the sensor reading indicates one or more of the following conditions:
      the battery needs to be replaced;
      the OTP generator has been tampered with;
      the OTP generator has been opened;
      the OTP generator has been subject to malicious activity;
      the OTP generator is located outside an acceptable radius from an expected location; and
      the user is under duress, the OTP generator modifies the OTP to include:
         a representation of a datum of information comprising the one or more conditions;
         and the OTP; and
   wherein the authentication engine:
      receives the OTP;
      analyzes the OTP to authenticate the user;
      analyzes the OTP to determine if the OTP includes the datum of information; and
      when the OTP includes the representation of the datum of information:
         analyzes the datum of information; and
         the server orders and initiates the sending of a new OTP generator to the user.

2. The apparatus of claim 1 wherein one sensor is a physical state sensor.

3. The apparatus of claim 1 wherein one sensor is a battery power level sensor.

4. The apparatus of claim 1 wherein the OTP is a QR code.

5. The apparatus of claim 1 wherein the datum of information is that the battery charge is low.

6. The apparatus of claim 1 wherein the form factor is a credit card.

7. The apparatus of claim 1 wherein the OTP is a sound.

8. A method for increasing information communicated by a one-time password ("OTP") generator, the method comprising:
   receiving, at a processor in the OTP generator, a sensor reading from one or more sensors included with the OTP generator, wherein the sensor reading indicates one or more of the following conditions:
      the battery needs to be replaced;
      the OTP generator has been tampered with;
      the OTP generator has been opened;
      the OTP generator has been subject to malicious activity;
      the OTP generator is located outside an acceptable radius from an expected location; and
      the user is under duress;
   analyzing, at the OTP generator, the sensor reading;
   determining, at the OTP generator, that the sensor reading requires one or more than one datum of information in addition to an OTP to be transmitted to an authentication engine at a server;
   when the OTP generator determines that no datum of information is required to be transmitted to the authentication engine:
      generating, at the OTP generator, a standard OTP; and
      displaying to a user, at a display on the OTP generator, the standard OTP;

when the OTP generator determines that one or more than one datum of information is required to be transmitted to the authentication engine:
generating, at the OTP generator, an enhanced OTP including a representation of the one or more than one datum of information and an OTP; and
displaying, at the display, the enhanced OTP;
receiving, at the authentication engine, a received OTP, the received OTP being either the standard OTP or the enhanced OTP;
comparing, at the authentication engine, the received OTP to an expected OTP, wherein the expected OTP is equivalent to the standard OTP;
when the received OTP is equivalent to the expected OTP, authenticating the user; and
when the received OTP is different from the expected OTP:
determining when the received OTP includes one or more than one datum of information;
ordering and initiating the sending of a new OTP generator to the user; and
executing an operation other than authentication of the user in response to the one or more than one datum of information.

9. The method of claim 8 wherein the operation includes authenticating the user.

10. The method of claim 8 wherein the operation includes issuing an alert to an administrator.

11. The method of claim 8 wherein the enhanced OTP is the standard OTP mathematically adjusted according to a distinct formula for each of the conditions.

12. A method for proactively replacing a one-time password ("OTP") generator, the method comprising:
receiving, at an authentication engine located at a server, an OTP from a user generated by the OTP generator;
decrypting the OTP;
when the OTP includes information indicating that the OTP generator needs to be replaced, automatically initiating the sending of a new OTP generator to the user.

13. The method of claim 12 further comprising when the OTP includes data indicating that the user is in duress, alerting an administrator.

14. The method of claim 12 further comprising when the OTP includes data indicating that the OTP generator has been tampered with, alerting a security administrator.

15. The method of claim 14 further comprising sending a signal to the OTP generator to deactivate the OTP generator.

16. The method of claim 12 wherein the information indicating that the OTP generator needs to be replaced includes information that a battery powering the OTP generator is failing.

* * * * *